(12) United States Patent
Crocker et al.

(10) Patent No.: US 12,214,482 B2
(45) Date of Patent: Feb. 4, 2025

(54) DRY FILTRATION SYSTEM

(71) Applicant: WATERBLASTING, LLC, Stuart, FL (US)

(72) Inventors: James P. Crocker, Stuart, FL (US); Stephen Carroll, Stuart, FL (US)

(73) Assignee: Waterblasting, LLC, Stuart, FL (US)

( * ) Notice: Subject to any disclaimer, the term of this patent is extended or adjusted under 35 U.S.C. 154(b) by 410 days.

(21) Appl. No.: 17/652,511

(22) Filed: Feb. 25, 2022

(65) Prior Publication Data

US 2022/0220682 A1 Jul. 14, 2022

Related U.S. Application Data

(60) Provisional application No. 63/154,079, filed on Feb. 26, 2021.

(51) Int. Cl.
| | | |
|---|---|---|
| *B25H 3/02* | (2006.01) | |
| *A47L 9/16* | (2006.01) | |
| *A47L 9/20* | (2006.01) | |
| *B01D 46/00* | (2022.01) | |
| *B01D 46/58* | (2022.01) | |
| *B01D 46/76* | (2022.01) | |
| *B01D 46/762* | (2022.01) | |
| *B01D 50/00* | (2022.01) | |
| *B01D 50/20* | (2022.01) | |
| *B65D 88/10* | (2006.01) | |
| *B65D 90/14* | (2006.01) | |
| *E01H 1/08* | (2006.01) | |
| *E01H 1/10* | (2006.01) | |

(52) U.S. Cl.
CPC .............. *B25H 3/02* (2013.01); *A47L 9/1683* (2013.01); *A47L 9/20* (2013.01); *B01D 46/58* (2022.01); *B01D 46/76* (2022.01); *B01D 46/762* (2022.01); *B01D 50/00* (2013.01); *B01D 50/20* (2022.01); *B65D 88/10* (2013.01); *B65D 90/14* (2013.01); *E01H 1/0827* (2013.01); *E01H 1/103* (2013.01); *B01D 2279/55* (2013.01)

(58) Field of Classification Search
CPC ........ B01D 46/00; B01D 50/00; B01D 46/58; B01D 46/76; B01D 46/762
See application file for complete search history.

(56) References Cited

U.S. PATENT DOCUMENTS 6,942,717 B2 * 9/2005 Armstrong ............. B01D 46/04
55/432

FOREIGN PATENT DOCUMENTS

CN 2607346 Y * 3/2004
DE 102006000310 A1 * 1/2008 ......... B01D 46/0071

\* cited by examiner

*Primary Examiner* — Robert A Hopkins
(74) *Attorney, Agent, or Firm* — McHale & Slavin, P.A.

(57) ABSTRACT

A mobile vehicle mounted dry filtration system to support a grinder system used for removal of markings, creating rumble strips, or the like. Blowers create a vacuum for drawing debris and dust from the grinder system into a debris bin. Large debris is removed from the vacuum draw and remains in the bin for later disposal. Small particles and dust are drawn into parallel positioned filter cyclones that have a cyclonic separation followed by flexible and inexpensive bag filters. The flexible filters are cleaned using vibrating diaphragms mounted on the top of the filter cyclones subject to a reverse air flow by the blowers using slide valves. A polishing tank containing water receives the exhaust from the filter cyclones for removal of airborne particles and sound suppression.

14 Claims, 13 Drawing Sheets

SECTION A-A

SECTION C-C

DRY FILTRATION SYSTEM

In accordance with 37 C.F.R. 1.76, a claim of priority is included in an Application Data Sheet filed concurrently herewith. Accordingly, the present invention claims priority to U.S. Provisional Patent Application No. 63/154,079, entitled "DRY FILTRATION SYSTEM", filed Feb. 26, 2021. The contents of the above referenced application is incorporated herein by reference in its entirety.

FIELD OF INVENTION

The present invention relates to debris removal and, more particularly, to a dry filtration system for removal of airborne particulate matter.

BACKGROUND INFORMATION

Road surface maintenance includes the removal and replacement of guidance markings. Thermoplastic material has become one of the most common types of guidance markings based on its balance between cost and performance longevity. Thermoplastic is durable, easy to apply, and can be used for markings such as yellow caution lines, white edge lines, turn signal lines, reflective markers, and so forth. When the markings need to be replaced, a common method is the use of a grinder vehicle that quickly removes the marking in preparation of a replacement marking.

Another type of surface preparation consists of rumble strips, which are a series of troughs ground into the asphalt roadway. Rumble strips can be used to warn of hazards of not staying within a specific lane, and can create a strong vibration and sound to alert vehicle drivers.

When surface markings are to be replaced, rumble strips ground, or the like maintenance, the use of a vehicle having a grinder head can be employed. A grinder head is capable of deep impact cuts into the road surface to form rumble or grooving strips, or for use in minimal surface impact for removal of thermoplastic markings without damaging the road surface.

The removal of surface markings and asphalt will result in the creation of fine airborne particulates. The particulates, including airborne silica dust, can be hazardous to the equipment operators, as well as the equipment.

Dry filtration techniques are known in the industry, consisting of filtering dust out of the air and then cleaning the filters in the dry filtration process. A conventional method for inline cleaning consist of a short pulse of air from a tank of compressed air, which does very little to actively restore air flow. A minimal amount of particles will pop off the surface, but then quickly return to almost the same location when normal air flow resumes. This method does not provide enough time for dust to fall out.

What is needed in the art is an improved dry filtration system that allows for efficient removal of airborne particulates and continuous cleaning of the filters.

SUMMARY OF THE INVENTION

Disclosed is a mobile vehicle mounted dry filtration system for removal of dust and debris. The system is in support of a grinder system used for removal of markings or creating rumble strips. Rotary lobe blowers powered by hydraulic motors used to create a vacuum for drawing debris and dust from the grinder system into a debris bin. Large debris is removed from the vacuum draw and remains in the bin for later disposal. Small particles and dust are drawn into parallel positioned filter cyclones having cyclonic separation followed by flexible bag filters. The flexible filters are cleaned using vibrating diaphragms mounted on the top of the filter cyclones, subject to a reverse air flow by the blowers using slide valves. A polishing tank containing water receives the exhaust from the filter cyclones for removal of airborne particles and sound suppression.

An objective of the invention is to provide a dry filtration system using sonic vibration for on-line continuous cleaning of inexpensive bag filters.

Another objective of the invention is to provide a dry filtration system for use in reduction of airborne silica.

Still another objective of the invention is to provide a system for off loading captured debris into an adjoining dump truck.

Still another objective of the invention is to provide a sonic vibration system using slide valves to allow instant and momentary high volume reverse air flow for cleaning of bag filters.

Still another objective of the invention is to teach the use of filter cyclones having a dust box and a debris bin which can be raised using a scissors jack, allowing the dust and debris to be placed into a dump truck.

Still another objective of the invention is to reduce the airborne dust while dumping by use of atomizing water with the correct charge, positive or negative, through nozzles arranged around the opening of the dust box or debris tank.

Yet still another objective of the invention is to teach the use of filter cyclones having a dust box adjoining a debris tank that can be lifted together, but doors opened independently to manage dust and debris disposal.

Yet still another objective of the invention is to provide a reduction of noise through a water polishing chamber. All exhaust air is pumped through water; water absorbs sound energy and collects dust particles as efficiently as a HEPA filter. Water is drained regularly and clean water is added.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION OF THE PREFERRED EMBODIMENT

While the present invention is susceptible of embodiment in various forms, there is shown in the drawings and will hereinafter be described a presently preferred and alternative embodiments with the understanding that the present disclosure is to be considered an exemplification of the invention and is not intended to limit the invention to the specific embodiments illustrated.

Figure 1:
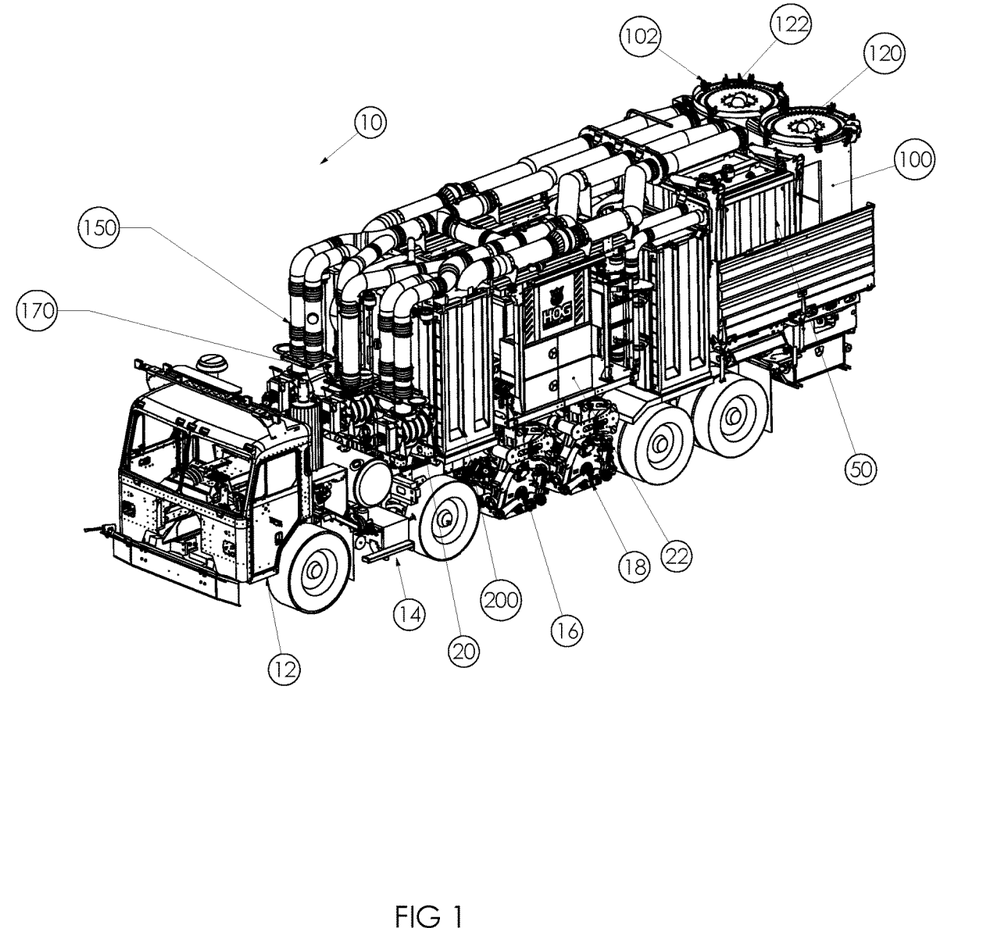
FIG. 1 is a perspective view of a mobile vehicle with the dry filtration system of the instant invention mounted thereto.
Figure 2:
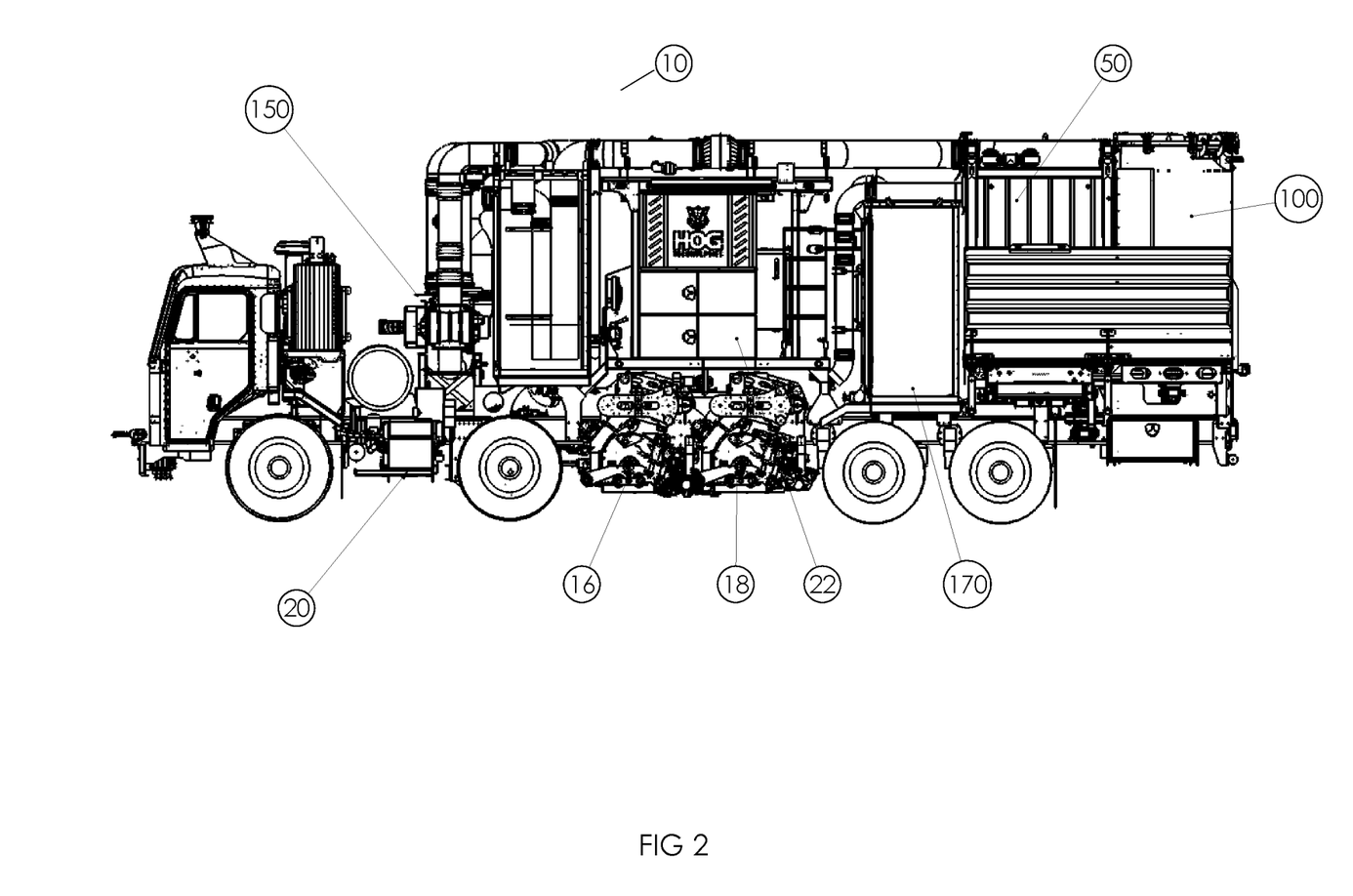
FIG. 2 is a side view thereof.
Figure 3:
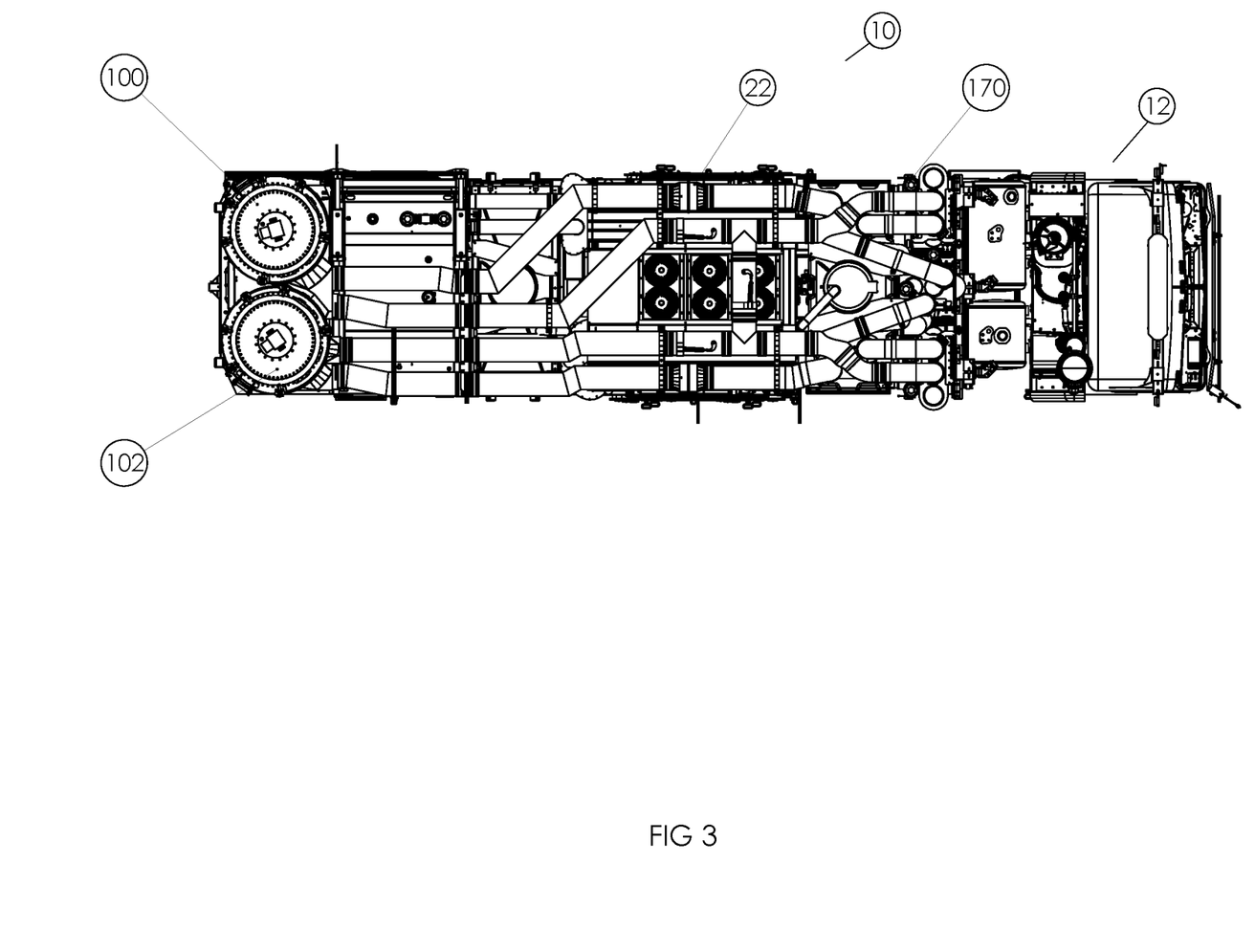
FIG. 3 is a top view thereof.

Referring to Figures, illustrated is the mobile vehicle 10 of the instant invention. The vehicle includes an operator's station 12 with a chassis 14 for support of a grinder system. The grinder system has controllable grinders 16 and 18 used for removal of markings or creating rumble strips, resulting in the creation of debris and the associated dust. Rotary lobe high vacuum blowers 20 powered by a hydraulic motor 22 are used in creating a vacuum for drawing debris and dust into a debris bin 50. Large debris is removed from the vacuum draw and remains in the bin 50 for later disposal. When the debris is to be dumped, airborne dust is removed by use of atomizing water with the correct charge, positive or negative, through nozzles arranged around the opening of the dust box or debris tank. With the debris held in the bin 50, small particles and dust are drawn into parallel positioned filter cyclones 100 and 102. The filter cyclones, explained later in this specification, capture small particles through a cyclonic separation and the dust is removed by bag filters 130. The bag filters 130 are cleaned using vibrating diaphragms 124 mounted on the top of the filter cyclones 100 and 102 and a reverse air flow provided by the blowers using a 3-way, 2-position slide valve 150 and a 3-way, 3-position slide valve 170. A polishing tank 200 is half full of water and receives the exhaust from the filter cyclones for removal of airborne particles and sound suppression.

Figure 4:
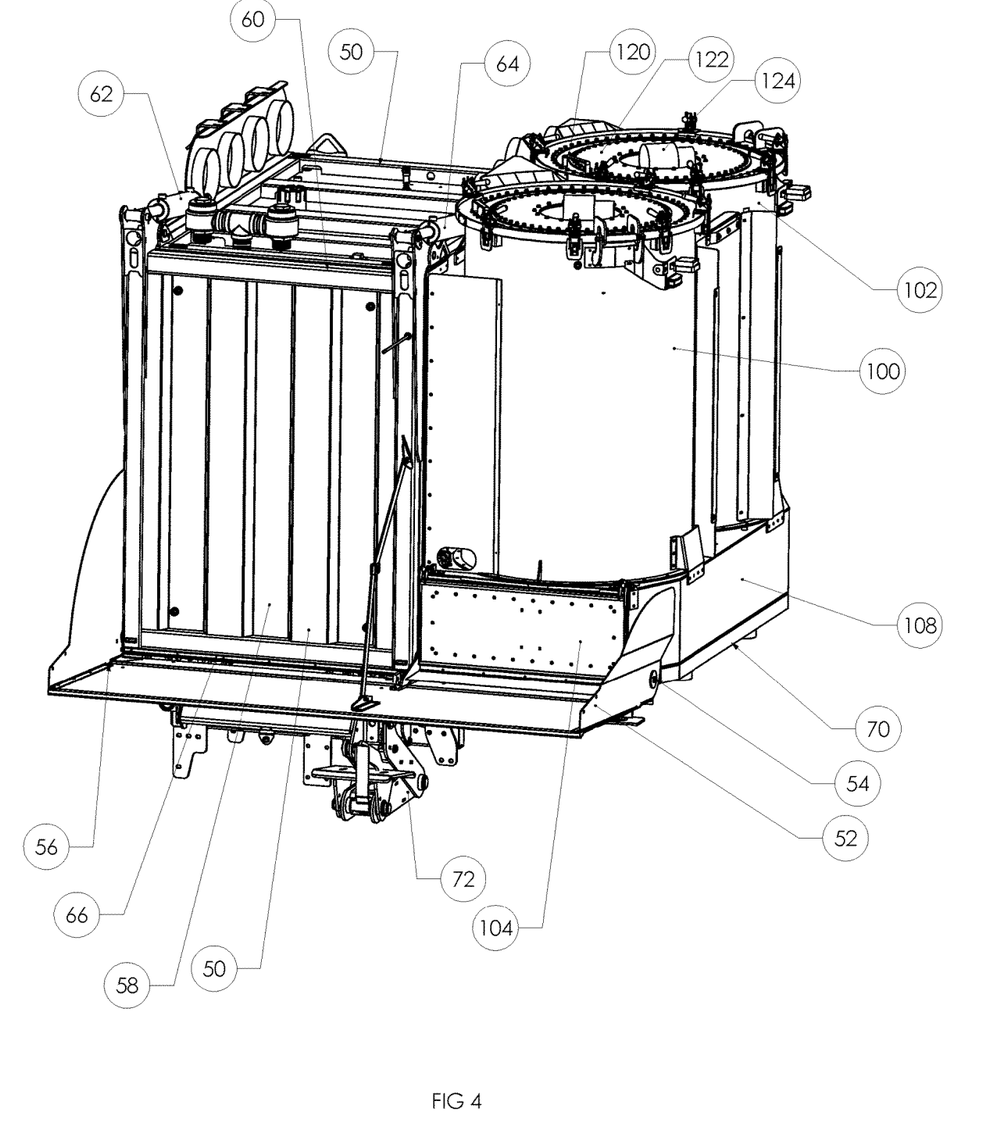
FIG. 4 is a perspective view of the debris bin and filter cyclones.

Referring to Figures, debris created by the grinders 16, 18 is first drawn through the debris bin 50; the debris bin 50 having sufficient volume to allow debris to separate from the flow caused by the blowers and remain in the bin 50 for subsequent disposal. When the debris bin 50 is to be emptied, a chute 52 is rotated into an open position along hinges 54, 56 as illustrated. A side door 58 of the bin 50 can be opened upwardly using a hinged upper edge by operation of the hydraulic rams 62, 64, which rotates a lower edge 66 of the door 58 into a raised position. During a bin emptying cycle, a platform 70 holding the debris bin 50 and filter cyclones 100, 102 can be raised by a jack mechanism 72 to place the platform 70 above an edge of an adjoining dump truck, not shown. The platform 70 can further be tilted in the raised position, wherein the debris held in the bin 50 can easily be transferred to the adjoining dump truck. Similarly, as will be further explained herein, a dust door 104 can be raised by a hydraulic ram 106 to expel collected dust from a collection box positioned beneath the filer cyclones 100, 102. The debris bin side door 58 and the dust door 104 open independently, wherein dust can be expelled first into a dump truck followed by the debris. In this manner, the dust is less likely to be lost during transit by the dump truck, as the debris operates as a cover for the dust.

Figure 5:
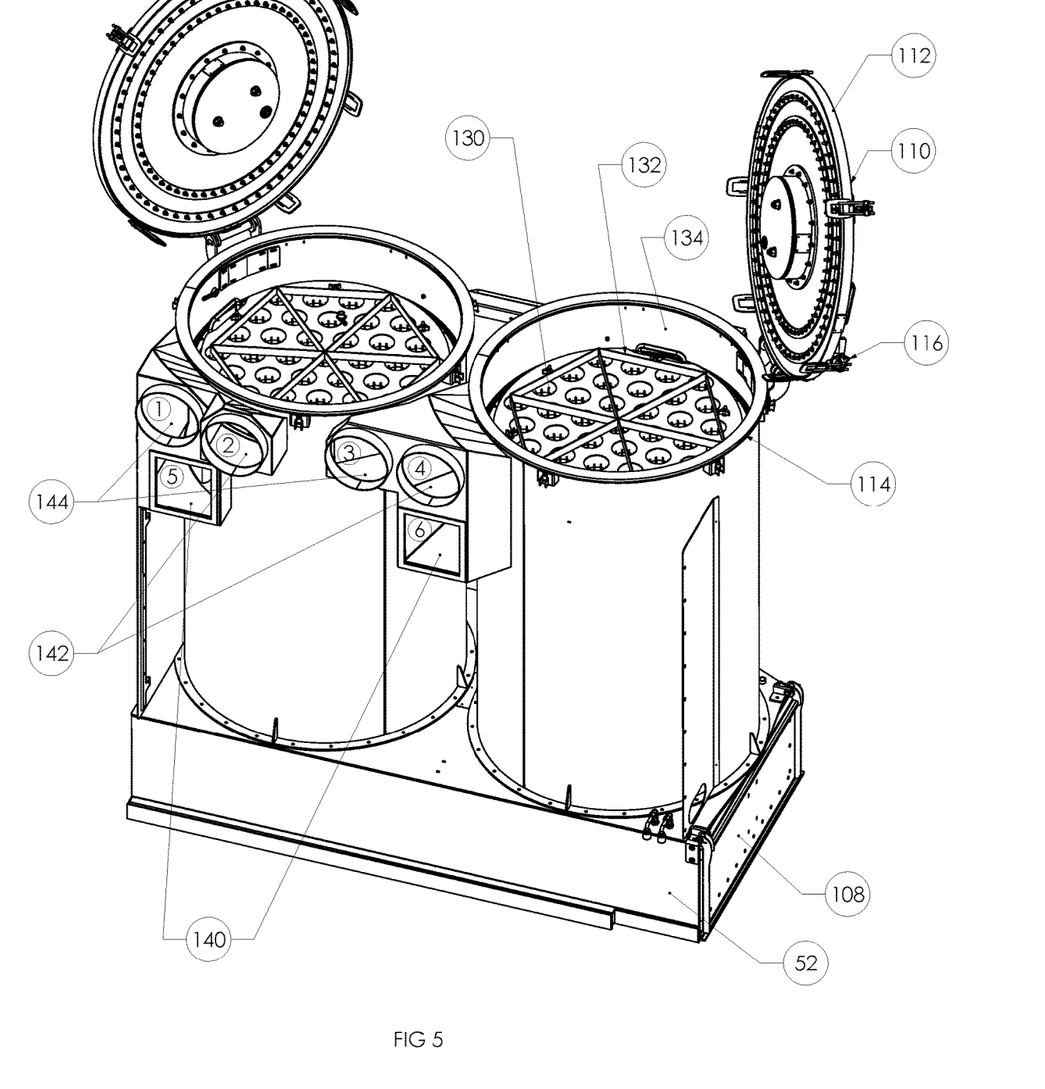
FIG. 5 is a perspective view of the filter cyclones with open lids.
Figure 6:
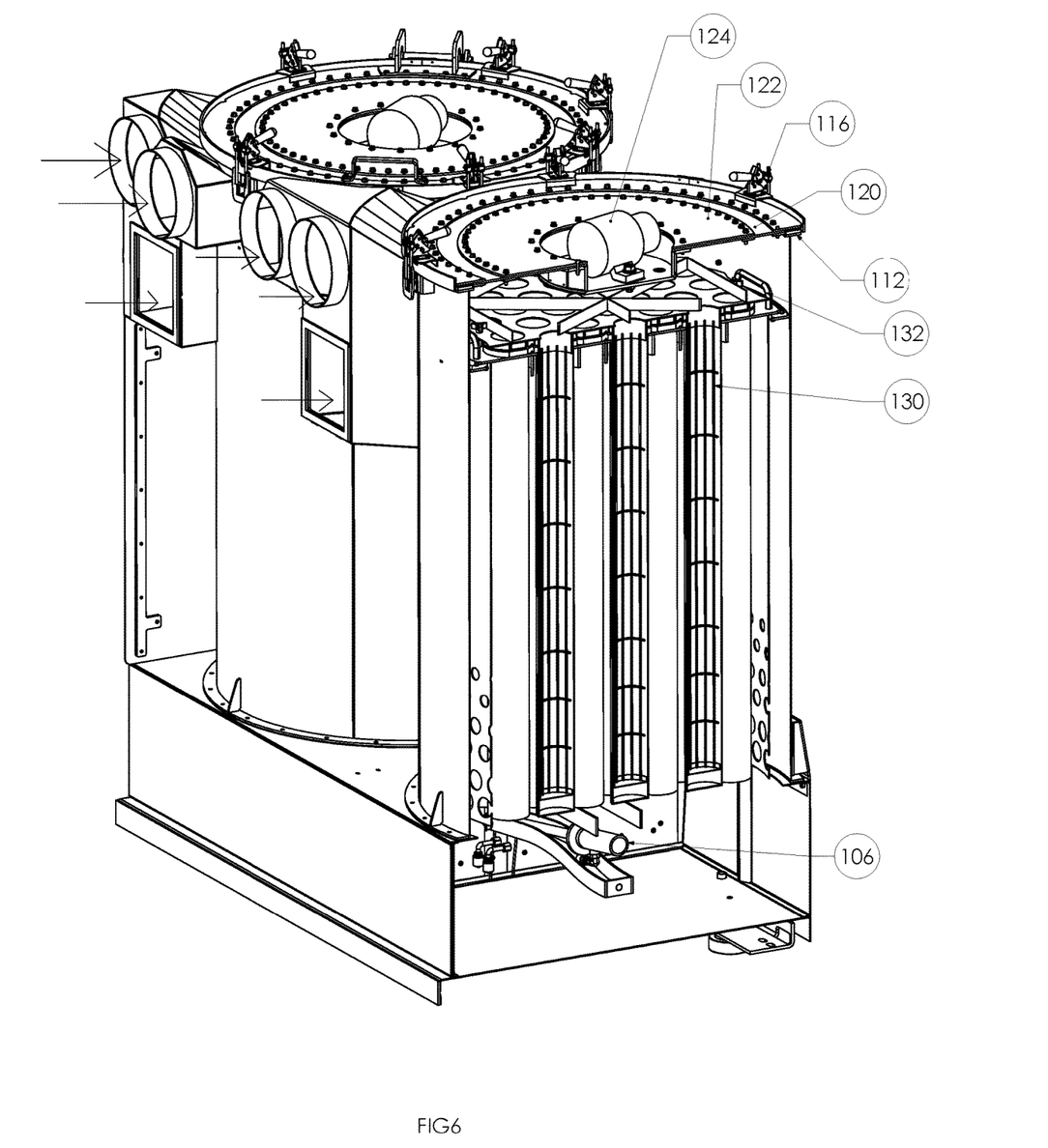
FIG. 6 is a cross-sectional view of a filter cyclone.

The filter cyclones 100, 102 are both pressure and vacuum rated. The tanks are placed in parallel for handling a typically work environment. Smaller volumes may use a single tank; larger volumes may use additional tanks. For ease of explanation, a single filter cyclone 100 will be described. The filter cyclone tank 100 includes a hinged lid 110 having an outer edge 112 that is secured to an upper edge 114 by a plurality of clamps 116. An inner circumference 120 of the hinged lid 110 employs a suspension material consisting of a fiber embedded rubber sheet for supporting a diaphragm 122 and a centrally disposed vibrator 124. Positioned within the tank 100 is a plurality of filter bags 130 providing about 500 sq ft surface area coverage. The filter bags 130 are placed in a housing 132 that is spaced apart from the inner surface 134 of the tank to allow a cyclonic air flow therebetween. The vibrator 124 is used to drive the diaphragm 122 up and down to produce both positive and negative pressure waves in the clean air stream that's inside the filter bags 130. The positive and negative pressure waves cause the filter bags walls to pulsate inward and outward, which dislodges the dust particles from the filter bags 130. The dislodged dust particles drop into the dust collection box 108 positioned beneath the filter bags 130. In combination with the vibrator 124, high volume clean air is introduced to the filter cyclones 100, 102, as will be explained further in this specification.

The unfiltered dusty air is drawn from the debris bin through unfiltered inlets 140. The dusty air is drawn between the filter housing 132 and the inner surface 134 of the tank wall 100, forming the cyclonic air flow which is capable of separating heavier dust from the remaining dust material which is drawn through the filters 130. Clean air that is drawn through the filters 130 is pulled through the filter outlets 142 positioned along the upper edge 114 of the tanks. A second set of inlets 144 positioned adjacent to the filter outlets 142 allow a high volume of clean air to be reversed into the filters 130 to supplement the sonic vibration produced by the vibrating diaphragms 124 and their diaphragms 122 for the purpose of dislodging dust from the filter bags 130.

Figure 7:
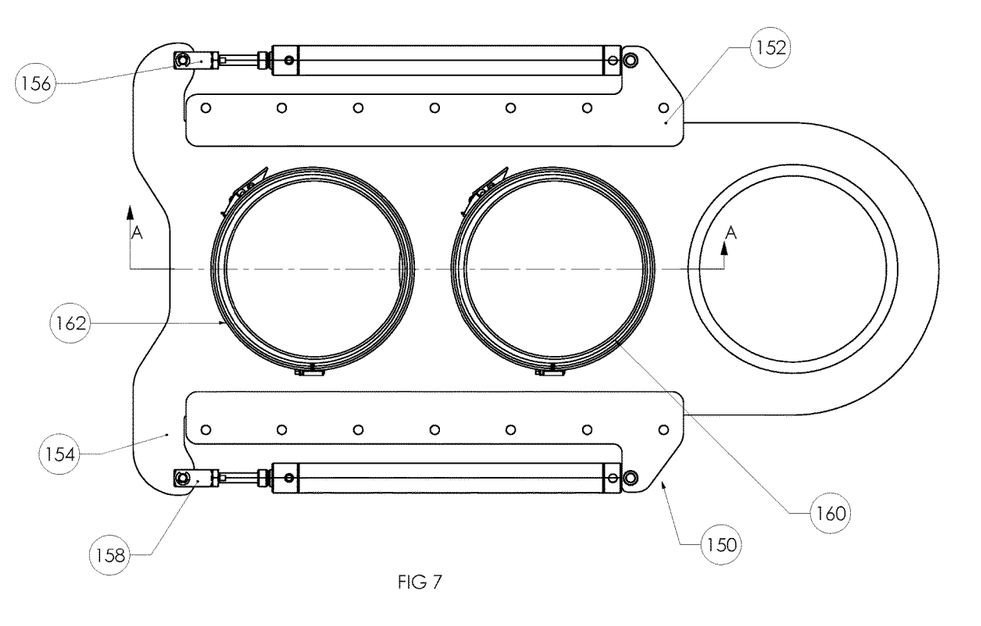
FIG. 7 is a plane view of a 3-way, 2-position slider in a normal position.
Figure 8:
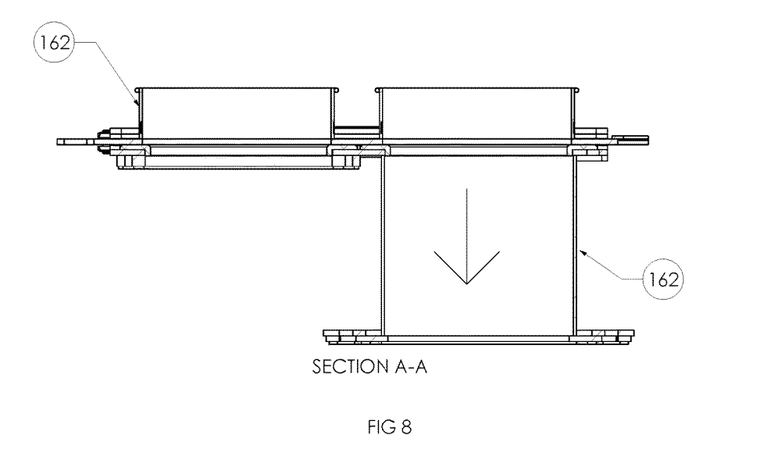
FIG. 8 is a plane view of the 3-way, 2-position slider in a reverse air position.
Figure 9:
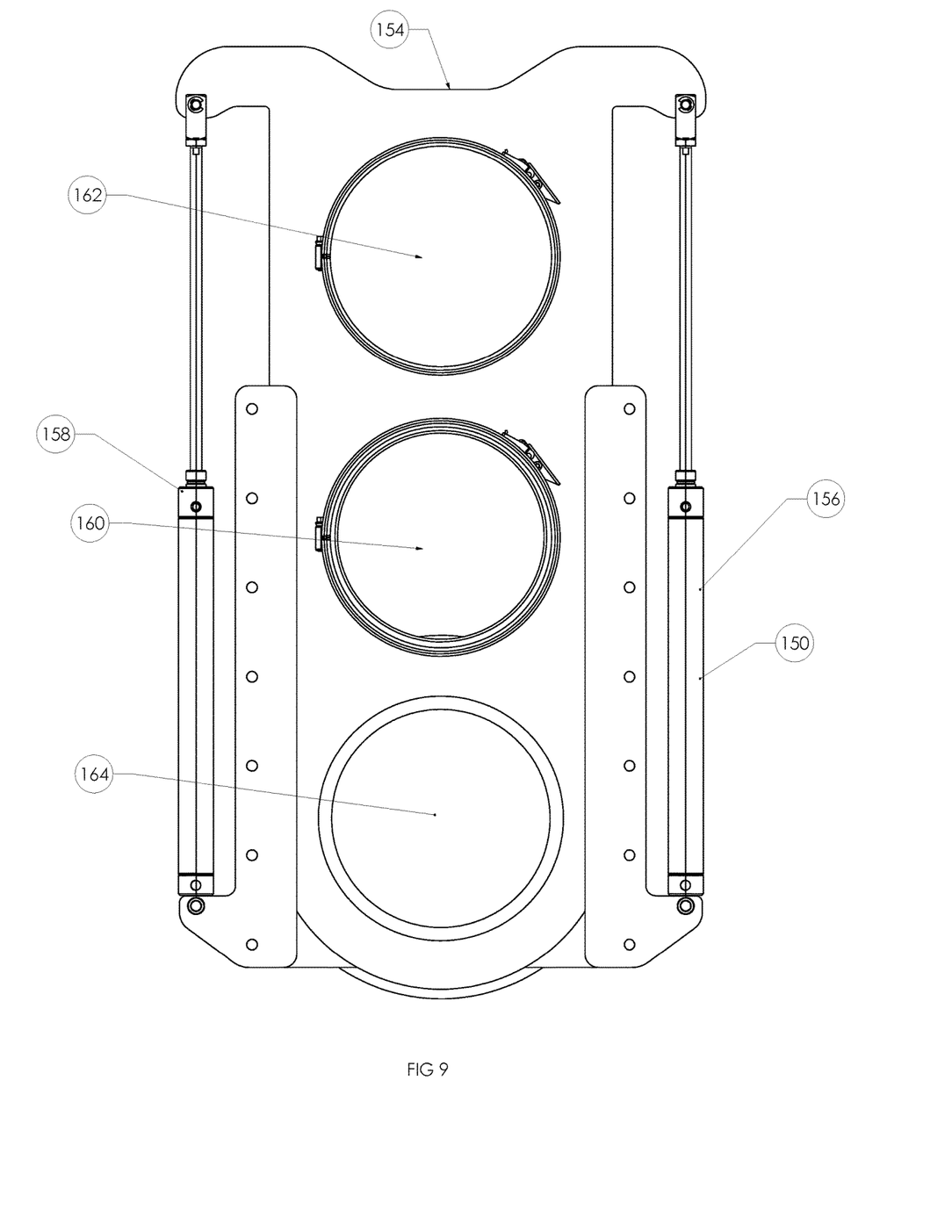
FIG. 9 is a side view thereof.

The high volume of clean air is provided by the use of slide valves. This is contrary to the conventional method of cleaning a filter by a short blast of compressed air. Referring to FIGS. 7-9, illustrated is a high speed 3-way 2-position slide valve 150 that is controlled by a PLC to perform cleaning functions as the operator selects. The slide valve 150 is formed from a base 152 and sliding plate 154 that is moved by actuators 156 and 158. A slide ring seal 163 is positioned between the base 152 and the sliding plate 154. In FIG. 7, the slide valve 150 is illustrated in the normal position with a first aperture 160 fluidly coupled to the vacuum side tube of a blower 20 and a second aperture 162 fluidly coupled to the compressed air side of the blower 20. In this position, air is being vacuumed from the filter cyclone 100 and directed to a polishing filter 200. As illustrated in FIG. 9, the slide valve 150 is in a reverse air flow position wherein the vacuum hose 162 of the cyclone filter is moved to the clean compressed air side of the blower, allowing a high volume of compressed air to flow back to the cyclone filter to supplement cleaning of the filters with the vibrating diaphragms. The hose coupled to the compressed side 162 is moved to a position open to the atmosphere, which discontinues air flow to the polishing chamber 200. The lower aperture 164 is on the vacuum side, providing clean ambient air to the blower. The slide position is moved by the actuators 156, 158.

Figure 10:
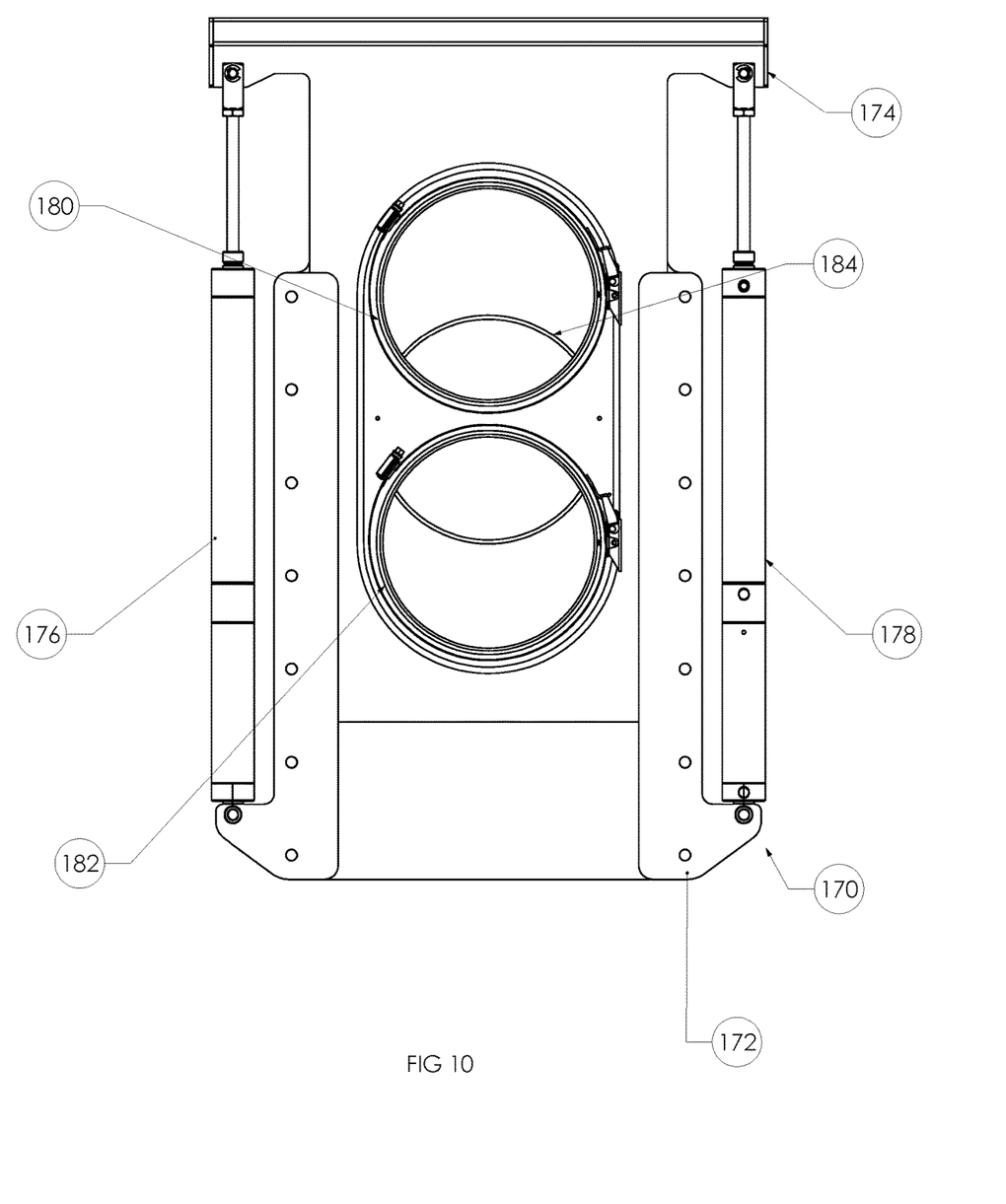
FIG. 10 is a plane view of a 3-way, 3-position slider in a normal position.
Figure 11:
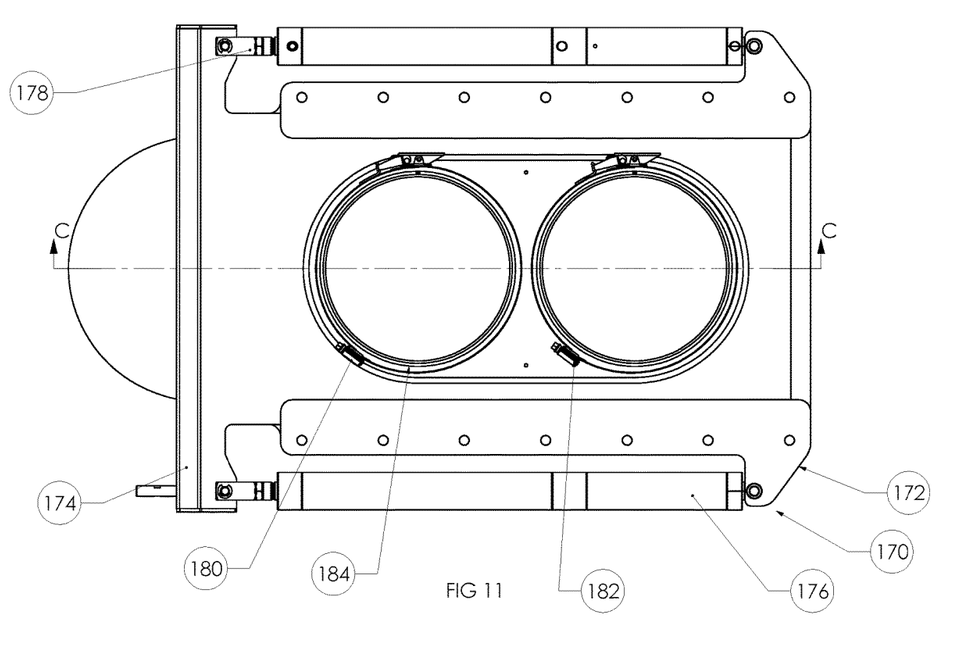
FIG. 11 is a plane view of the 3-way, 3-position slider in position to clean one filter cyclone.
Figure 12:
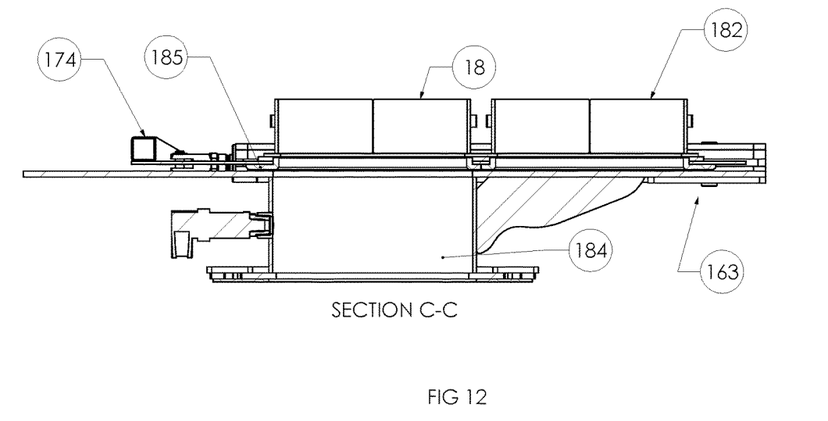
FIG. 12 is a side view thereof.

FIGS. 10-13 illustrate the 3-way, 3-position splitter high speed slide valve 170. FIG. 10 illustrates the valve 170 in the normal position, which is the non-cleaning mode. The slide valve 170 has a base 172 and slide plate 174 using 3-position actuators 176 and 178. In this figure, the actuators 176 and 178 are placed in a partially extended position with the vacuum air hose to the first cyclone tank attached to an upper aperture 180 and the vacuum air hose to the second cyclone tank attached to the lower aperture 182. The vacuum inlet 184 is drawing air from both the first and second cyclone tank 100, 102. Referring to FIGS. 11 and 12, the slide valve 170 is shown in a position for cleaning the second cyclone, wherein 3-position actuators 176, 178 are placed in a retracted position with the first filter cyclone inlet 182 receiving full vacuum air flow from the blower inlet 184, while the second cyclone tank is being cleaned. The second filter cyclone aperture 182 is shut off because it is under pressure while it is being cleaned.

Figure 13:
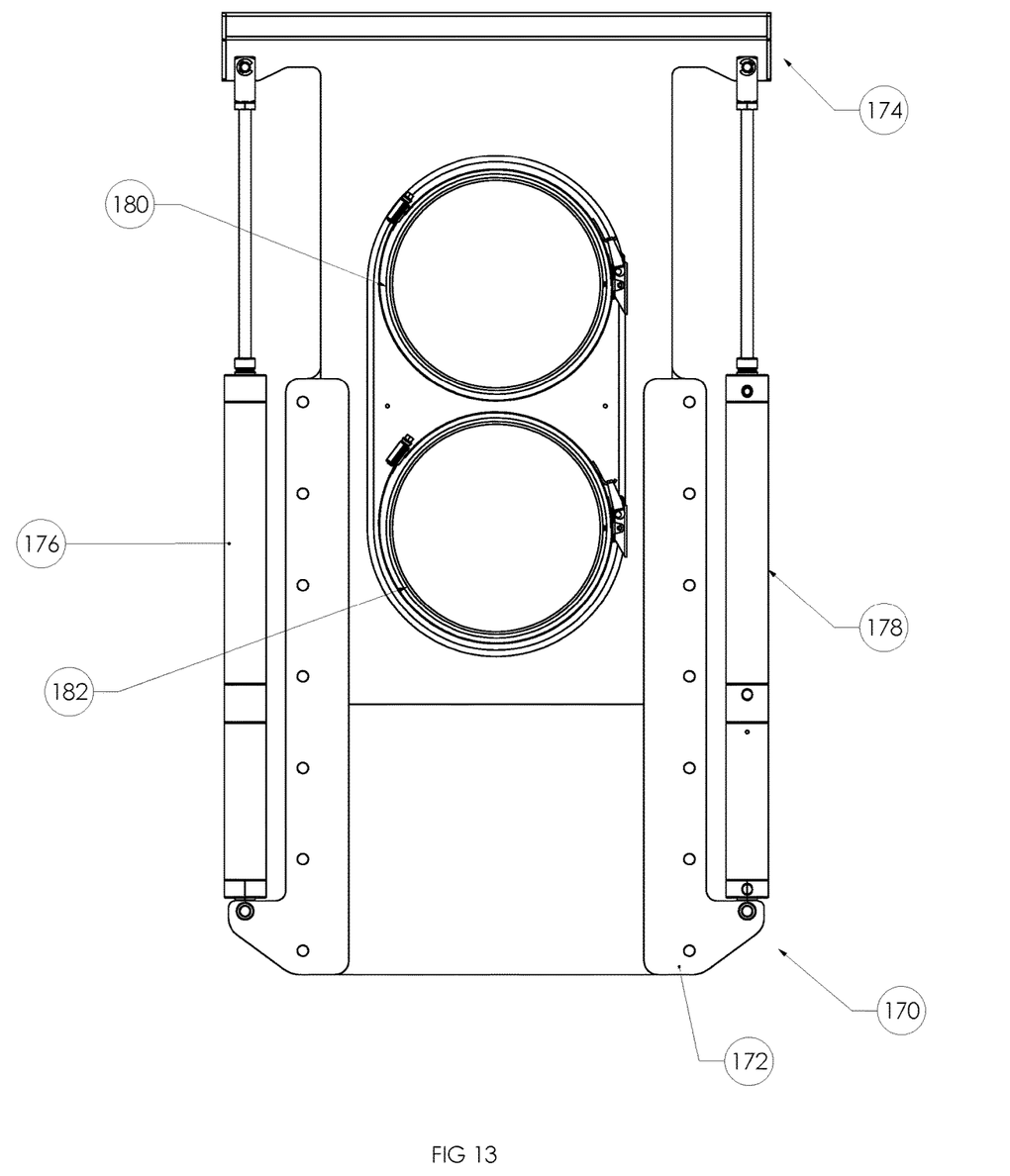
FIG. 13 is a plane view of the 3-way, 3-position slider in position to clean a second filter cyclone.

FIG. 13 depicts the slide valve 170 in a position for cleaning the first filter cyclone. A slide ring seal 185 is positioned between the base 172 and the sliding plate 174. In this illustration, 3-position actuators 176 and 178 are placed in an extended position with the second filter cyclone receiving full vacuum air flow from the blower aperture 180, while the first cyclone tank is being cleaned. The aperture for the first filter cyclone is shut off because it is under pressure while it is being cleaned.

Figure 14:
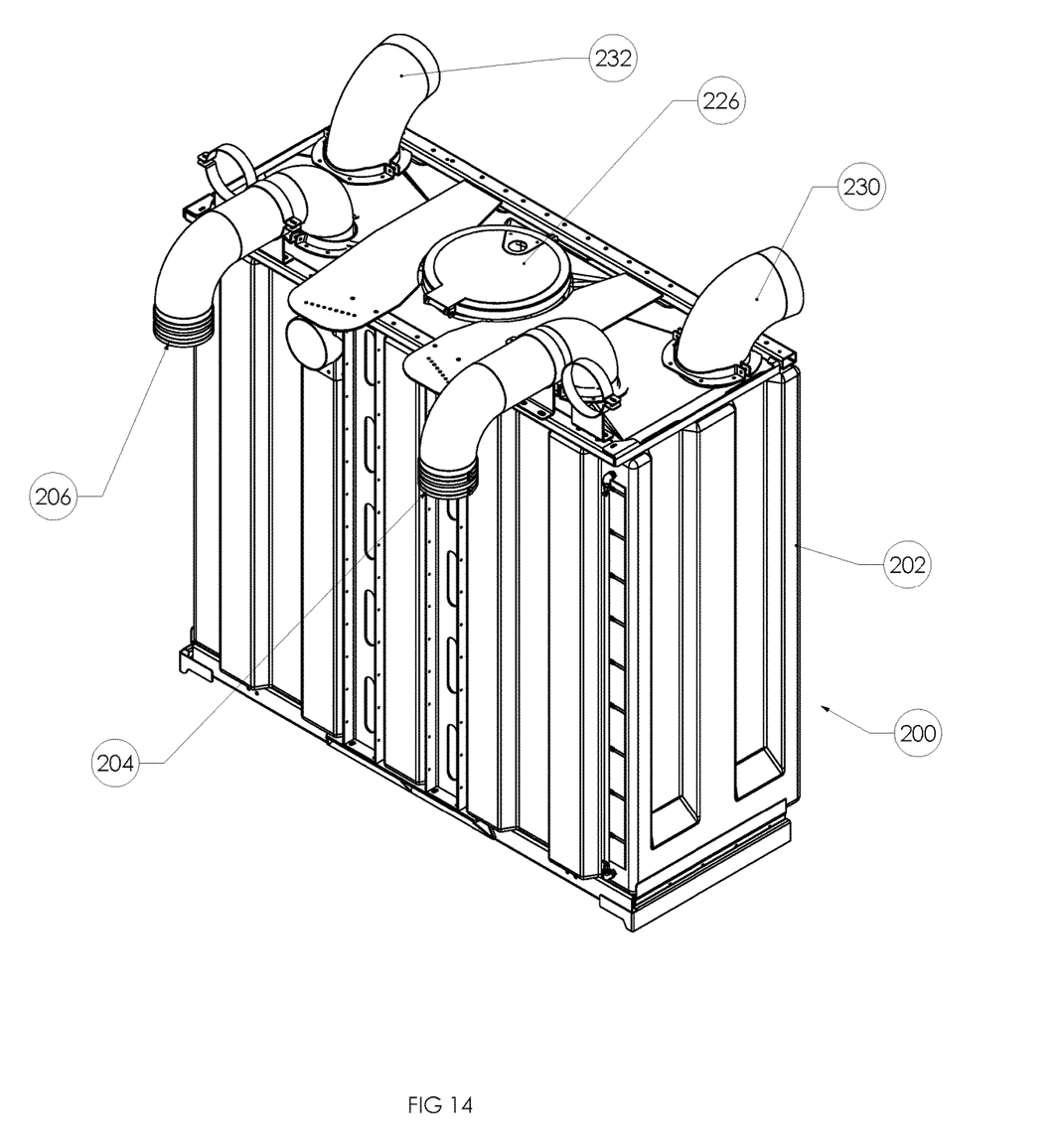
FIG. 14 is a perspective view of a finishing chamber.
Figure 15:
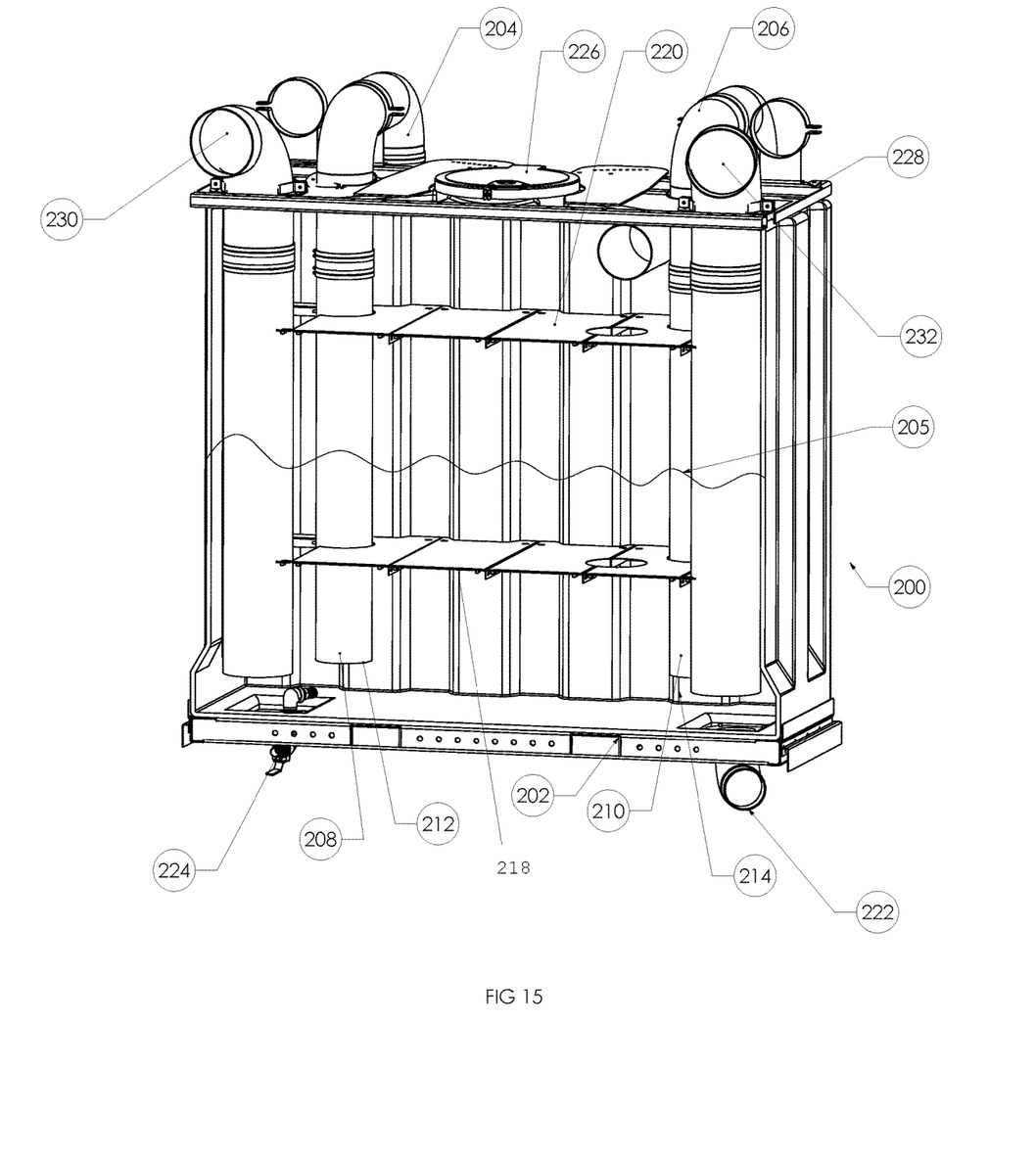
FIG. 15 is a cross-sectional view thereof.

Referring to FIGS. 14 and 15, the polishing chamber 200 is used to reduce the dust and noise for the dry filtration process. The polishing chamber consists of a substantially rectangular tank 202 that is half filled with water 205. Exhaust air is received through inlets 204, 206 from the debris bin 50 while the filters 130 are in use. Exhaust air enters the polishing tank 200 through the inlets 204, 206 and is directed through piping 208, 210 having outlets 212, 214 immersed in the water 205. A lower perforated plate 218 and an upper perforated plate 220 are constructed and arranged to control aeration, mixology and splash with the exhaust air expelled into the water. The water 205 absorbs sound energy in a manner similar to outboard motor exhaust placement used in the marine industry. The water collects dust particles, providing particle efficiency in removal. The water is drained regularly through a drain connection 222 and clean water is added through a fill valve 224. The exhaust exits a flap lid 226 on the top 228 of the tank 202. The exhaust at this stage is substantially free of particles, and the noise level greatly reduced as the water operates as a muffler. Exhaust air is directed through inlets 230, 232 while the filters are being used, exhaust air is directed through inlets when filters are being cleaned.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A filtrations system for a mobile vehicle operating a grinder used for removal of markings or creating rumble strips, said filtration system comprising:
    a debris bin secured to said mobile vehicle;
    a rotary lobe vacuum blower fluidly coupled to said debris bin, said vacuum blower having a suction juxtapositioned to the grinder for drawing debris into said debris bin;
    a filter cyclone fluidly coupled to said debris bin, said filter cyclone formed from a cylindrical tank having a plurality of spaced apart filter bags constructed and arranged to allow a cyclonic flow of air therebetween before passing through said filter bags for separating particles from the debris, said cylindrical tank having a collection box positioned beneath said filter bags;
    a vibrator positioned along an outlet of said spaced apart filter bags, said vibrator displacing a diaphragm wherein said diaphragm provides alternating positive pressure and negative pressures within said filter bags for dislodging particles adhering to said filter bags;
    a polishing tank partially filled with water coupled to an exhaust of said filter cyclone, said polishing tank constructed and arranged to direct the exhaust of the filter cyclone through the water for removal of airborne particles and to provide sound suppression and a slide valve for reversing a high volume of cleaned air through said filter bags, said slide valve is a 3-way 2-position slide valve controlled by a PLC providing a forward air flow direction wherein a first aperture is fluidly coupled to a vacuum side of said blower, a second aperture is fluidly coupled to a compressed air side of said blower wherein air is being vacuumed from said filter cyclone and directed to said polishing filter; wherein a reverse air flow position positions a vacuum of said cyclone filter moved to a clean compressed air side of said blower allowing a high volume of compressed air to flow back to said cyclone filter, the aperture coupled to the compressed side of said blower is directed to atmosphere which discontinues air flow to said polishing chamber.

2. The dry filtration system according to claim 1 wherein said rotary lobe vacuum blower is operated by a hydraulic motor.

3. The dry filtration system according to claim 1 including a water system for spraying atomizing water through nozzles in said debris bin to facilitate dust removal.

4. The dry filtration system according to claim 1 including a chute hingedly attached to said collection chamber for directional flow of debris from said chamber.

5. The dry filtration system according to claim 1 wherein said filter cyclone tank is pressure rated and includes a hinged lid for placement of said diaphragm above said filter bags.

6. The dry filtration system according to claim 5 wherein said filter bags provide about 500 sq ft surface area coverage, said filter bags constructed and arranged to pulsate inward and outward to dislodge dust particles therefrom when subjected to the positive and negative pressure waves caused by said diaphragm.

7. The dry filtration system according to claim 1 wherein said slide valve is a 3-way 3-position slide valve controlled by a PLC, said slide valve having a first aperture coupled to a vacuum air and said first filter cyclone and a second aperture coupled to the vacuum air and a second filter cyclone drawing air from said first and second filter cyclone; and reversing of said slide valve wherein actuators operating said apertures are placed in a retracted position with an inlet of said first filter cyclone receiving full vacuum air flow from said blower while said second filter cyclone tank is cleaned.

8. The dry filtration system according to claim 1 wherein said polishing chamber consists of a substantially rectangular tank having at least one perforated plate constructed and arranged to control aeration, mixology and splash with exhausted air expelled into the water.

9. A filtrations system for a mobile vehicle operating a grinder used for removal of markings or creating rumble strips, said filtration system comprising:
  a debris bin secured to said mobile vehicle;
  a rotary lobe vacuum blower fluidly coupled to said debris bin, said vacuum blower having a suction juxtapositioned to the grinder for drawing debris into said debris bin;
  a filter cyclone fluidly coupled to said debris bin, said filter cyclone formed from a cylindrical tank having a plurality of spaced apart filter bags constructed and arranged to allow a cyclonic flow of air therebetween before passing through said filter bags for separating particles from the debris, said cylindrical tank having a collection box positioned beneath said filter bags;
  a slide valve for reversing a high volume of cleaned air through said filter bags;
  a vibrator positioned along an outlet of said spaced apart filter bags, said vibrator displacing a diaphragm wherein said diaphragm provides alternating positive pressure and negative pressures within said filter bags for dislodging particles adhering to said filter bags;
  a polishing tank partially filled with water coupled to an exhaust of said filter cyclone, said polishing tank constructed and arranged to direct the exhaust of the filter cyclone through the water for removal of airborne particles and to provide sound suppression wherein said slide valve is a 3-way 3-position slide valve controlled by a PLC, said slide valve having a first aperture coupled to a vacuum air and said first filter cyclone and a second aperture coupled to the vacuum air and a second filter cyclone drawing air from said first and second filter cyclone; and reversing of said slide valve wherein actuators operating said apertures are placed in a retracted position with an inlet of said first filter cyclone receiving full vacuum air flow from said blower while said second filter cyclone tank is cleaned.

10. The dry filtration system according to claim 9 including a water system for spraying atomizing water through nozzles in said debris bin to facilitate dust removal.

11. The dry filtration system according to claim 9 wherein said filter cyclone tank includes a hinged lid for placement of said diaphragm above said filter bags.

12. The dry filtration system according to claim 9 wherein said filter bags provide about 500 sq ft surface area coverage, said filter bags constructed and arranged to pulsate inward and outward to dislodge dust particles therefrom when subjected to the positive and negative pressure waves caused by said diaphragm.

13. The dry filtration system according to claim 9 wherein said slide valve is a 3-way 2-position slide valve controlled by a PLC providing a forward air flow direction wherein a first aperture is fluidly coupled to a vacuum side of said blower, a second aperture is fluidly coupled to a compressed air side of said blower wherein air is being vacuumed from said filter cyclone and directed to said polishing filter; wherein a reverse air flow position positions a vacuum of said cyclone filter moved to a clean compressed air side of said blower allowing a high volume of compressed air to flow back to said cyclone filter, the aperture coupled to the compressed side of said blower is directed to atmosphere which discontinues air flow to said polishing chamber.

14. The dry filtration system according to claim 9 wherein said polishing chamber consists of a substantially rectangular tank having at least one perforated plate constructed and arranged to control aeration, mixology and splash with exhausted air expelled into the water.

\* \* \* \* \*